United States Patent
Borduz et al.

(10) Patent No.: US 8,841,232 B1
(45) Date of Patent: Sep. 23, 2014

(54) ADVANCED CERAMIC CATALYST

(71) Applicants: Lucian Borduz, Northwood, NH (US); Dumitru Tuclea, Bucharest (RO); Stefan Borduz, Kailua-Kona, HI (US)

(72) Inventors: Lucian Borduz, Northwood, NH (US); Dumitru Tuclea, Bucharest (RO); Stefan Borduz, Kailua-Kona, HI (US)

( * ) Notice: Subject to any disclaimer, the term of this patent is extended or adjusted under 35 U.S.C. 154(b) by 0 days.

(21) Appl. No.: 14/106,233

(22) Filed: Dec. 13, 2013

(51) Int. Cl.
*B01J 21/06* (2006.01)
*B01J 29/78* (2006.01)

(52) U.S. Cl.
CPC .................................. *B01J 29/78* (2013.01)
USPC ........... 502/300; 502/304; 502/242; 502/340; 502/350

(58) Field of Classification Search
None
See application file for complete search history.

(56) References Cited

U.S. PATENT DOCUMENTS

| | | | |
|---|---|---|---|
| 3,492,986 A | 12/1963 | Partiot | |
| 3,302,689 A | 2/1965 | Milligan | |
| 3,179,157 A | 4/1965 | Partiot | |
| 3,277,948 A | 10/1966 | Best | |
| 3,852,215 A | 12/1974 | Duhaut et al. | |
| 3,900,429 A | 8/1975 | Komatsu et al. | |
| 3,903,020 A | 9/1975 | Sergeys et al. | |
| 4,056,489 A | 11/1977 | Hindin et al. | |
| 4,220,559 A | 9/1980 | Polinski | |
| 4,402,662 A | 9/1983 | Pfefferle | |
| 4,537,873 A * | 8/1985 | Kato et al. | 502/242 |
| 4,604,229 A | 8/1986 | Raj et al. | |
| 4,732,706 A | 3/1988 | Borduz et al. | |
| 5,417,566 A * | 5/1995 | Ishikawa et al. | 431/328 |
| 6,019,954 A | 2/2000 | Tang et al. | |
| 7,063,527 B2 * | 6/2006 | Clifford et al. | 431/326 |
| 7,208,128 B2 * | 4/2007 | Furbeck et al. | 423/245.1 |
| 2003/0158035 A1 * | 8/2003 | Ito et al. | 502/304 |
| 2010/0068120 A1 * | 3/2010 | Deevi et al. | 423/437.2 |

FOREIGN PATENT DOCUMENTS

RO 116547 3/2001

* cited by examiner

*Primary Examiner* — Melvin C Mayes
*Assistant Examiner* — Colette Nguyen
(74) *Attorney, Agent, or Firm* — Lambert & Associates; Gary E. Lambert; David J. Connaughton, Jr.

(57) ABSTRACT

The present disclosure generally relates to an advanced ceramic catalyst made by metal oxides dispersed in refractory ceramics and the process of making same. The advanced ceramic catalyst is capable of significantly lowering carbon foot prints and noxious emissions by generating the same heat energy with much lower quantity of fuel such as of natural gas, propane and other gaseous hydrocarbons. A process of making such a catalyst from inexpensive combination of metal oxide prepared in solution to have many oxygen lattice defects and particle size distribution selected from nanometer to millimeter range which can provide a huge surface area for combustion reaction thus lowering the activation energy of combustion.

7 Claims, 2 Drawing Sheets

ADVANCED CERAMIC CATALYST

BACKGROUND OF THE INVENTION

1. Field of the Invention

This invention relates to a catalyst for catalytic combustion of a fuel. More particularly, the present invention relates to an advanced ceramic catalyst made by metal oxides dispersed in refractory ceramics and the process of making same.

2. Description of Related Art

Metal oxides have been known for many years to act as catalysts in reaction related to combustion, byproduct of combustion and many other chemical reactions. Metal oxides like Cobalt (Co), Nickel (Ni), Molybdenum (Mo), Zinc (Zn), Iron (Fe), Copper (Cu), Titanium (Ti), Chromium (Cr), Tin (Sn), Antimony (Sb), Tungsten (W), Vanadium (V), etc., precious metals like Gold (Au) and Platinum (Pt), some Lanthanide like Cerium (Ce), Neodymium (Nd) and others.

There are several patents, patents applications and published studies about using metal oxides like Co, Ni, Mo, Zn, Fe, Cu, Ti, and Cr.

H. Furbeck, et al., "Manganese-based oxidation catalyst", U.S. Pat. No. 7,208,128 (Apr. 24, 2007) discloses Raschig rings which are a mixtures of $Mn_3O_4$ and $Al_2O_3$ who were treated with phosphoric acid solution to improve the rings catalytic effect of oxidative destruction of Volatile Organic Compounds and carbon monoxide, the byproduct of a variety of commercial establishments.

S. Deevi, et al., "Catalysts for low temperature oxidation of carbon monoxide", U.S. Pat. Application No. 20100068120 (Mar. 18, 2010) discloses a copper oxide-zinc oxide-cerium oxide catalyst precipitated together in solution by aging at 70° C. for at least 3 hours, filtered, washed, dried and calcined. Cerium oxide precipitated on copper oxide has the capability of carbon monoxide oxidation carbon dioxide. Catalyst with lattice defects capable of oxidizing carbon monoxide in cigarettes. It is assumed that the catalyst has some nanoparticle resulted in decomposition of aged precipitate. The composition of the oxide in the catalyst is 100%.

L. Borduz, et al., "Method of preparing low viscosity, electrically conductive ferrofluid composition", U.S. Pat. No. 4,732,706 (Mar. 22, 1988) and K. Raj, et al. "Electrically conductive ferrofluid compositions and method of preparing and using same", U.S. Pat. No. 4,604,229 (Aug. 5, 1986) discloses a low viscosity, electrically conductive ferrofluid composition where nanoparticles of magnetite is precipitated in solution covered with cationic surfactants, separated and dispersed in an oil to produce a final magnetic ferrofluid electrical conductible used in seal devices.

W. Pfefferle, "Thermal shock resistant split-cylinder structures", U.S. Pat. No. 4,402,662 (Sep. 6, 1983) discloses a cylindrical structure monoliths ceramic with high coefficient of thermal expansion nickel doped stabilized zirconia. There is no claim of a particular catalyst, however, it is mentioned in the invention description that the catalyst is recommended to be ceramic oxide metal of the spinel type such as magnesium chrome and lanthanum chrome spinels specially selected to be able to make a curved shape as a cylinder.

H. Ishikawa, et al., "Method of preventing burning resonance noise and a burner plate", U.S. Pat. No. 5,417,566 (May 23, 1995) discloses a burner plates having a multiple of fire holes adapted to dispose of burner chamber defining an acoustic system having characteristic frequency. A burner plate wherein the burner varies in thickness from its center outwardly.

W. Best, "Radiant burner utilizing flame quenching phenomena", U.S. Pat. No. 3,277,948 (Oct. 11, 1966) discloses a unitary plate shaped member of refractory ceramic adapted for use in forming a radiant burner with the slot-shaped passage extending through substantially the shorter distance from the rear surface of the burner.

W. Milligan, "Catalytically active radiant tile", U.S. Pat. No. 3,302,689 (Feb. 7, 1967) discloses a catalytically active radian theater tile comprising a highly porous refractory plate having an input surface and an opposed combustion surface, said refractory plate containing a combustion catalyst dispersed therein and having a pore volume area of at least 100 square meters per gram of plate. Has been also discover that the catalytic activity of common metallic oxides catalyst can be stimulated sufficiently to exceed even the noble metal catalyst.

W. Milligan, "Catalytically active radiant tile", U.S. Pat. No. 3,302,689 (Feb. 7, 1967) discloses a catalytically active radian theater tile comprising a highly porous refractory plate having an input surface and an opposed combustion surface, said refractory plate containing a combustion catalyst dispersed therein and having a pore volume area of at least 100 square meters per gram of plate. Has been also discover that the catalytic activity of common metallic oxides catalyst can be stimulated sufficiently to exceed even the noble metal catalyst.

M. Partiot, "Deep combustion radiant surface gas burner", U.S. Pat. No. 3,179,157 (Apr. 20, 1965) and M. Partiot, "Directional beamed radiant heaters", U.S. Pat. No. 3,492,986 (Feb. 3, 1970) discloses a deep combustion radiant surface burner constructed to conduct combustible gas mixture to surface thereof and comprising a unitary block of refractory material having a myriad bore substantially straight elongated from the first to the second boundary surface.

F. Tang, et al., "Catalyst and process for the conversion of carbon monoxide", U.S. Pat. No. 6,019,954 (Feb. 1, 2000) disclose a catalyst for conversion of Carbon monoxide with steam into carbon dioxide and hydrogen, Catalyst comprise of Co, Ni, Mo and/or W as oxides or sulfide as active components on TiO2 containing carrier and non-alkali metal element promoters used in the conversion of carbon monoxide with steam into carbon dioxide and hydrogen at 230 to 500 C under pressure between 0-10 MPa (absolute).

S. Hindin, et al., "High temperature stable catalyst composition and method for its preparation", U.S. Pat. No. 4,056,489 (Nov. 1, 1977) disclose a high temperature stable catalyst composition and method for its preparation. The catalyst contains mostly platinum and platinum-palladium expensive product. The application is for atomized gasoline. The platinum group metal may be precipitated from solution, for example, as a sulfide by contact with hydrogen sulfide. The only limitation on the carrier liquids is that the liquids should not react with the platinum group metal compound and be removable by volatilization or decomposition upon subsequent heating and/or vacuum, which may be accomplished as part of the preparation or in the use of the completed catalyst composition. Suitable platinum group metal compounds are, for example, chloroplatinic acid, potassium platinum chloride, ammonium platinum thiocyanate, platinum tetramine hydroxide, platinum group metal chlorides, oxides, sulfides, and nitrates, platinum tetramine chloride, palladium tetramine chloride, sodium palladium chloride, hexamine rhodium chloride, and hexamine iridium chloride.

L. Polinski, et al., "High temperature-stable catalyst composition", U.S. Pat. No. 4,220,559 (Sep. 2, 1980) discloses catalysts having good high temperature stability, which are particularly useful for carrying out high temperature reactions, such as combustion reactions at temperatures of the order of 1000°-1400° C., are disclosed. The catalytic active materials include precious metals, base metals or their oxides, or precious metals in combination with base metals, deposited on a catalyst slip or composite, which contains alumina in admixture with a metal oxide component. The metal oxide component consists of a mixture of strontium or barium oxide with molybdenum trioxide, zircon, silica, or stannous oxide or of a mixture of lanthanum with silica or stannous oxide. The slips or carrier compositions are calcified at a temperature of at least 500° C. before deposition of the precious metal or base metal material, and are characterized by having a surface area of at least 20 m$^2$/g after calcination at a temperature of 1200° C. for 4 hours.

This invention relates to catalyst compositions, and in particular to catalyst compositions characterized by high stability, thereby maintaining good catalytic activity when used in reactions carried out at temperatures in excess of 1000° C. Catalyst compositions exhibiting a relatively high surface area per unit weight are desirable to allow the largest amount of reactants to contact the catalyst. Additionally, high surface area is important when the catalyst composition contains a precious metal such as platinum because of the cost of the metal and because of the dispersion required to prevent undue metal crystallite growth. It is desirable to retain this high surface area for long periods of use under severe conditions which might include reaction temperatures of the order of 1000-1400° C. Thus combustion reactions advantageously are carried out in the presence of such a catalyst at temperatures of 1200° C. or higher for extended periods.

Kato, "Catalyst for catalytic combustion", U.S. Pat. No. 4,537,873 (Aug. 27, 1985), discloses a catalyst for catalytic combustion of a fuel used in an apparatus wherein high-temperature gases formed from said fuel are utilized, and particularly for catalytic combustion comprising a precious metal supported on a special carrier, said catalyst being very slight in lowering in performance even under high temperatures.

It is an object of this invention to provide a catalyst for catalytic combustion overcoming the defects of the prior art technique mentioned above, and exhibiting only a slight lowering of performance even used at high temperatures, said catalyst being obtained by carrying a precious metal on a carrier which can prevent the agglomeration of the precious metal component under high temperature conditions and exhibiting only a slight lowering of the specific surface area by sintering.

This invention provides a catalyst for catalytic combustion comprising precious metal particles supported on a carrier obtained from (a) titanium as a first component and (b) as a second component at least one metal oxide selected from the group consisting of oxides of magnesium, strontium, lanthanum, yttrium, cerium, zirconium, silicon and tin.

P. Duhaut, "Catalyst for hydrocarbon conversion", U.S. Pat. No. 3,852,215 (Dec. 3, 1974) discloses a catalyst and process for converting or reforming, hydrocarbons. The catalyst contains an alumina carrier, platinum, iridium and at least one metal selected from the group consisting of scandium, yttrium, titanium, zirconium, hafnium, thorium and germanium.

F. Sergeys, "Stabilized automotive exhaust gas catalyst", U.S. Pat. No. 3,903,020 (Sep. 2, 1975) discloses a process for preparing an ultra-stable catalyst capable of converting the noxious components in exhaust gases to innocuous entities is described. The catalyst is made by applying a solution of a salt of a noble metal such as palladium or platinum to a specially prepared support followed by activation at 1,800°-2,100° F. The special support is prepared by activating and stabilizing common support materials such as alumina with cerium oxide at high temperatures prior to application of the noble metal. The catalyst is stable to 2,100° F.

N. Komatsu, et al., "Catalyst for purifying exhaust gases", U.S. Pat. No. 3,900,429 (Aug. 19, 1975) discloses a catalyst for purifying exhaust gases from internal combustion engines and the like which consists essentially of a particulate mixture of nickel particles and copper particles; nickel particles, copper particles and chromium particles; or nickel particles, copper particles, chromium particles and an oxide selected from the group consisting of yttrium oxide, titanium dioxide, lanthanum oxide and mixtures thereof, wherein said particulate mixture is sintered and at least partially oxidized Romanian Patent 116547 (Mar. 30, 2001), "The process to obtain some ceramic products and the materials employed to make such products", discloses a procedure to obtain ceramic products and a process to obtain such ceramic products. The process consist of sintering ceramic material made of mixture of kaolin, talc steatite, alumina, aluminum hydroxide and other materials at 700-1450 decree C. The ceramic material is subjected to 6-12 h of milling in a mill using corundum balls to granules of 18-36%. The milling process takes place in an acid solution of hydrochloric acid of 2-7% strength. The weight ratio of ceramic materials: corundum balls: acid solution is 3:2:2.

The ceramic material used for specific application will provide a superior caloric efficiency in the process of using natural gas. The ceramic material because of the catalytic properties will assure a smooth combustion without variation in the flame behavior.

The ecological efficiency are superior, the safety pressure of combustion is situated in the range of 5-10 mm column of water.

The caloric/energetic efficiency is in the range of 10-40%

C. Clifford, et al., "Burner plaque with continuous channels", U.S. Pat. No. 7,063,527 B2 (Jun. 20, 2006) discloses a ceramic burner plaque of predetermined thickness defined between first and second surface and through plurality of burner ports pass from one surface to other. The ports are arranged in offset rows and plurality of polygonal channels.

In a situation involving two species a reaction may only occur if they come into contact with each other. They first have to collide, and then they may react.

It is not enough for the two species to collide—they have to collide in just the right way, and they have to collide with enough energy/speed for chemical bonds to break. Collisions result only in a reaction if the particles collide with enough energy to get the reaction started. This minimum energy required is called the activation energy for the reaction.

To increase the rate of a reaction the number of successful collisions must be increase. One possible way of doing this is to provide an alternative way for the reaction to occur that has a lower activation energy. In the case of combustion on a catalyst, the hydrocarbon is adsorbed on the catalyst surface and will easily react with the very mobile oxygen from the catalyst.

The activation energy is obtained by consuming a portion of the overall energy generated by combustion. The lower the activation energy the more efficient the combustion will be.

In hydrocarbon combustion reactions with air, nitrogen (which is about 80% of the air composition) is in competition with the hydrocarbons for oxygen. Nitrogen, by reacting with oxygen, will use heat to provide for the activation energy of its reaction with oxygen, lowering the combustion efficiency. The unwanted reaction between nitrogen and oxygen generate nitrous oxides and will lower the available oxygen needed to react with the hydrocarbons. Quite a number of the hydrocarbon molecules will not be part of the combustion reaction because no oxygen molecules are available, further lowering the combustion efficiency and increasing the carbon footprint. The unwanted reaction of nitrogen with oxygen is also the main source of emission pollution in this particular type of combustion.

Therefore, a highly efficient, stable and economically effective catalyst is desirable to increase the efficiency of combustion reactions.

SUMMARY OF THE INVENTION

The subject matter of this application may involve, in some cases, interrelated products, alternative solutions to a particular problem, and/or a plurality of different uses of a single system or article.

In one aspect, a composition of a ceramic catalyst is provided. The composition may comprise an activated metal oxide and a precursor of the activated metal oxide uniformly dispersed throughout a catalyst support. The catalyst support may be a ceramic made of a material having a very low coefficient of thermal expansion and a very low thermal conductivity. The activated metal oxide may comprise metal oxide particles of controlled diameters ranging from nanometers to millimeters arranged in a crystal lattice, the metal oxide particles having a plurality of oxygen vacant holes in the crystal lattice, the crystal lattice configured to allow oxygen to rapidly migrate to a surface of the metal oxide by progressively diffusing from one oxygen vacant hole to another allowing the metal oxide to reduce and oxidize molecules on its surface, the diffusion rate of oxygen being directly related to the number of oxygen vacant holes, the number of oxygen vacant holes increasing as the diameter of the metal oxide particles decreases, an increasing diffusion rate causing an increasing catalytic activity.

In another aspect, a method for producing a ceramic catalyst having a uniformly dispersed and controlled size of metal oxide particles is provided. The method may begin by producing, in a polar aqueous solvent, an activated metal oxide and a precursor of the activated metal oxide, the activated metal oxide comprising metal oxide particles arranged in a crystal lattice, the metal oxide particles having a plurality of oxygen vacant holes in the crystal lattice, the crystal lattice configured to allow oxygen to rapidly migrate to a surface of the metal oxide by progressively diffusing from one oxygen vacant hole to another allowing the metal oxide to reduce and oxidize molecules on its surface, the diffusion rate of oxygen being directly related to the number of oxygen vacant holes, the number of oxygen vacant holes increasing as the diameter of the metal oxide particles decreases, an increasing diffusion rate causing an increasing catalytic activity of the activated metal oxide.

Then a quantity of the metal oxide may be precipitated by adjusting the pH of the aqueous solvent. This may be followed by mixing a surfactant having a hydrophobic tail into an aqueous mixture of the polar aqueous solvent and the metal oxide particles, the hydrophobic tail coating the metal oxide particles preventing the particles from agglomerating and causing the particles to disperse throughout the mixture, the surfactant comprising at least one of an anionic surfactant, a cationic surfactant, a non-ionic surfactant, a zwitterionic (amphoteric) surfactant and a non-ionic block copolymer.

Then a non-polar solvent may be mixed into the aqueous mixture causing the metal oxide particles to selectively separate into a first distribution and a second distribution based on a size of a particle and a length of the surfactant hydrophobic tail, the first distribution separating into the non-polar solvent and comprising particles of about nanometer to submicron diameter, the second distribution separating into the polar aqueous solvent of the aqueous mixture and comprising particles of about micron to millimeter in diameter.

This may then be followed by separating the non-polar solvent and the polar aqueous solvent, the metal oxide particles of about nanometer to submicron diameter being dispersed in the non-polar solvent and the metal oxide particles of about micron to millimeter in diameter being dispersed in the polar aqueous solvent.

A flocculant may then be mixed into the separated non-polar solvent causing the metal oxide particles of about submicron diameter to flocculate.

This may then be followed by separating the flocculated particles from the non-polar solvent leaving a slurry more concentrated in nanometer sized particles. The slurry may then be dried, followed by optionally grinding a mixture of the slurry, ceramic catalyst support and an argyle mud composition to a powder wherein the weight ratio of the ceramic catalyst support to the argyle mud composition is about eighty percent to twenty percent.

The powder may then be mixed with a quantity of a cellulose derivative and a quantity of water forming a ceramic mass, the ratio of the powder to the cellulose derivative being at least 20 parts to 0.2 parts. The ceramic mass may optionally be press molded using at least 40 ton per square centimeter pressure to produce a porous ceramic catalyst having pores of a desired shape and size. The ceramic catalyst may then be dried, thermally treated and cooled.

In yet another aspect, a method for producing a ceramic catalyst having controlled size of metal oxide particles disposed on a ceramic catalyst is presented. The method may begin by immersing a porous catalyst support into a hydrocarbon solvent having a suspension of activated metal oxide particles of controlled diameters for at least 2 hours, the activated metal oxide particles coated with a hydrophobic tail of a surfactant, the pores of the catalyst support at least partially being filled and coated with the activated metal oxide particles to form a ceramic catalyst. The ceramic catalyst may then be dried and processed in a furnace.

In present patent application the precipitation of the metal oxide or precursor in solution is achieved in the presence of a surfactant. The surfactant prevents agglomeration of the metal oxide particles, thus assuring a controlled particle size distribution and also enables extraction of the surfactant covered particles in a hydrocarbon solvent for further screening the particles to a narrow size distribution that may be compatible for a specific combustion application.

It is an object of this invention to provide a more active catalyst precipitated in solution with a selected distribution obtained by using surfactants with a range of tail lengths to cover the particles from nanometer to submicron particles size distributions. Particles which additionally can be selectively screened in mixtures of polar and non-polar solvents, to form, as needed, a narrow size particle sized distribution having available oxygen defects or vacancy in the lattice and also providing a huge increase of surface area available for combustion. The combustion reactions on the activated catalyst contemplated herein require a relatively low activation energy and in turn will take much less energy from the system. This reaction is an order of magnitude faster than the oxidation reaction of nitrogen. The catalyst will give a good portion of oxygen needed for combustion and in the same time will recover the given-up oxygen from the air supplied for combustion. The oxygen supplied by the activated catalyst will travel from vacancy to vacancy arriving at the surface of the catalyst with very high speed and it will react easily with $CH_4$ and will require a small amount of energy to be taken from the system in order to react with the natural gas or other combustible fuel.

The key to making more active catalyst metal oxides includes (1) to make more available oxygen defects or vacancy in the lattice and (2) to increase the surface area available for combustion reaction by using submicron metal oxide particles.

It is an object of this patent application that the main activated metals oxide catalyst are: $CeO_{2-X}/Ce_2O_3$, $Fe_3O_{4-X}$, $MnO_{2-X}$; $Cr_2O_{3-X}$, CuO, ZnO and other metal oxides such as Mo, Sn, Sb, V; Zr, Co, Ni, and W, all dispersed in, or disposed on, a ceramic support made of material selected from the group consisting of molochite, silicon carbide, cordierite, and combinations thereof, or materials of similar structure. In one embodiment, the activated metal oxide particles may be uniformly dispersed throughout the ceramic catalyst. In another embodiment, the activated metal oxide particles may be selectively dispersed in designated spots in the ceramic catalyst, such as the fire holes, or the passageway for the mixture of natural gas and air.

In yet another embodiment, the size distribution of the metal oxide particles of an activated metal oxide may range from nanoparticles to micron sized particles. In a particular embodiment, the size distribution by weight of the metal oxide particles in the activated metal oxide (also referred to as the formulation catalyst) may be 1-98% nanoparticles, 1-98% submicron particles, 10-98% micron particles and 10-98% millimeters particles. The total weight of the formulation catalyst accounting for at least 2% by weight of the total weight of the ceramic catalyst, which may vary depending on the specific combustion application. The terms activated metal oxide and formulation catalyst may be interchangeably used in this specification.

The configuration of the ceramic catalyst including features such as plate thickness as well as the hole or pore diameters and the gas jet configuration may be selected to facilitate a majority of the combustion reaction take place on a surface of the catalyst particles.

By lowering the activation energy for combustion, and additionally lowering the probability of nitrogen to react with oxygen, the appliance will result in a fuel savings of at least 30% to achieve the same amount of heat production. This will result in substantial economic benefit to consumers and the appliance will operate with a significantly reduced carbon footprints.

It is another object of the present invention to reduce carbon monoxide (CO) emissions. CO is a colorless, odorless, highly poisonous gas, formed by the incomplete combustion of carbon or a carbonaceous material (natural gas, gasoline, coal, and oil). This catalyst will reduce the formation of CO by encouraging complete combustion of the fuel. Carbon monoxide is a danger in all situations, but particularly in airtight houses where fuel burners are often in use.

DETAILED DESCRIPTION OF THE INVENTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Figure 1:
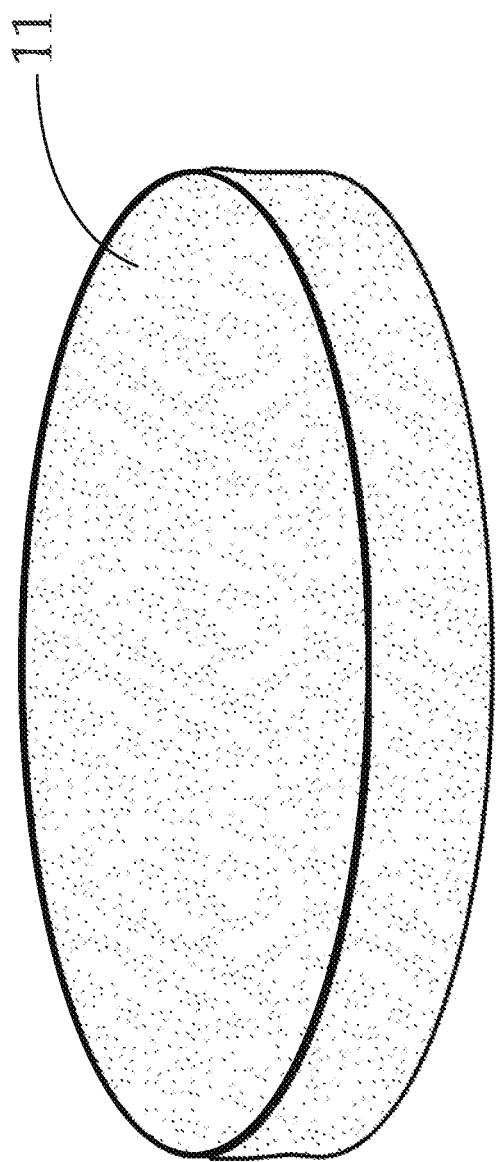
FIG. 1 illustrates an embodiment of a ceramic catalyst.

FIG. 1 illustrates an embodiment of the ceramic catalyst 10 having pores 11 of a desired shape and size. The pores 11 are configured to allow a burning natural gas and air to flow through the ceramic catalyst 10 when in use. In one embodiment, the ceramic catalyst 10 may be placed above a gas outlet of a stove, range, grill or any flame use device, either as an aftermarket accessory or built in during the manufacturing of the device. In this embodiment, the ceramic catalyst 10 may be used in catalyzing a chemical process (e.g. oxidation or combustion of a natural gas) by flowing a burning natural gas and air through the porous ceramic catalyst 10 having uniformly dispersed and controlled size of metal oxide particles, the metal oxide particles arranged in a crystal lattice of an activated metal oxide, the metal oxide particles having a plurality of oxygen vacant holes in the crystal lattice, the crystal lattice configured to allow oxygen to rapidly migrate to a surface of the metal oxide by progressively diffusing from one oxygen vacant hole to another allowing the metal oxide to reduce and oxidize molecules on its surface, the diffusion rate of oxygen being directly related to the number of oxygen vacant holes, the number of oxygen vacant holes increasing as the diameter of the metal oxide particles decreases, an increasing diffusion rate causing an increasing catalytic activity of the activated metal oxide, consequently, increasing a reaction rate for a reaction mixture. The chemical processes may include, but are not limited, to hydrogenation, dehydrogenation, hydrogenolysis, oxidation, reduction, alkylation, dealkylation, carbonylation, decarbonylation, coupling, isomerization, amination, deamination, and hydrodehalogenation.

In order to obtain the best energy efficiency of the combustion reaction of hydrocarbon and oxygen, the metals oxide catalyst used according to this invention has to be very active as a catalyst by having many oxygen defects or vacancies in the oxide lattice and the metal oxide catalyst must also present a large surface area for reaction between the hydrocarbons and oxygen molecules. The configuration of the ceramic catalyst plate thickness as well as the holes or passageways diameters and the jet configuration has to assure that most of the combustion reaction take place on the surface of the catalyst particles. This large surface area is provided by a range of particles sized from nanometers to millimeter ranges. These particles can be selectively obtained in solution using a range of surfactant tail length to cover the particles. Then, the particles will be further screened in mixtures of non-polar and polar solvents to form, as needed, a narrow size distribution which will have more available oxygen defects in the lattice and also provide a huge increase of surface area available for combustion. The activated catalyst particles can be controlled to be sized from nanometers to submicron sized. By obtaining different sizes of the activated catalyst particles, the surface area for catalytic reaction and the number of lattice defects or vacancy can be controlled. The smaller the particle sizes the greater the activated surface.

In order to make more available oxygen defects or vacancies in the lattice, we present in this patent application a method involving precipitation of the catalyst oxide or their precursors followed by screening of the catalyst particles. We use metal oxides with less than stoichiometric oxygen in the oxide crystal. For example, $MeO_{2-X}$, $MeO_{1.5}$ to $MeO_{1.95}$ instead of $MeO_2$ or $Me_3O_{3.5}$ to $Me_{3.9}$ instead of $Me_3O_4$. In this case, the metal oxide crystal will have oxygen defects which will generate exceptionally high diffusion rates of activated oxygen to the catalyst surface. There are several procedures that can be utilized to make metal oxide with oxygen defects or vacancies.

First, an example of the production of $Fe_3O_4$ (magnetite) which is a crystal stoichiometric mixture of $Fe_2O_3$ ferric oxide ($Fe^{3+}$ ferric) and FeO ferrous oxide ($Fe^{2+}$ ferrous) is presented. Alternatively, we can say that for one molecule of $Fe_2O_3$ there is a corresponding one molecule of FeO or for one mole of $Fe_2O_3$ we need one mole of FeO to make one mole of almost perfect (not so many defects) $Fe_3O_4$. By using less than one mole of ferric (Fe3+) compound in co-precipitation reaction with one mole of ferrous Fe2+ compound we will bring less oxygen in the molecules of final magnetite crystal. Instead of $Fe_3O_4$ formula of the crystal we will have $Fe_3O_{4-X}$ or with oxygen vacancies or defects. The oxygen near the vacancy will migrate to the vacant hole and progressively diffuse from vacancy to vacancy to the surface of the activated crystal particle of the magnetite. The magnetite particles prepared with this procedure will be an activated catalyst.

Second, the use a metal oxide obtained by an electrochemical process. For example, $MnO_2$ (used in electrical batteries) in high electrical density currents electrolysis condition will produce a $MnO_2$ with many oxygen vacancies and is a good candidate to be an activated catalyst.

Third, the co-precipitation of metal oxides in the presence of small impurities of different chemical element. For example in the preparation of $CeO_2$ where Ce hydroxide precipitate has trace impurities such as Ni, V, Zn, Sb, Co, W, and Zr in concentration of 0.001 to 1 g/Liter in solution prepared for metal oxide catalyst precipitation.

In one embodiment, the metal oxide oxygen defects may be achieved by preparing a submicron metal oxide with a diameter of 10-1000 nanometers. Here the particles are covered with a surfactant to avoid particle agglomeration before calcination, as in the case of FeO4 and ZnO. Submicron size particles have many crystalline defects and also an immense surface area, which makes a high quality catalyst.

It is to be understood that there are several paths through which the oxidation or combustion reaction of hydrocarbon and oxygen may take place. The most predominant path consists of the physical adsorption of the hydrocarbons on the catalyst surface followed by the chemical reaction between the hydrocarbons and the reactive oxygen (activated) provided by a catalyst such as $MeO_2$ according to steps (1) to (4) below:

(1) $2MeO_2 = Me_2O_3 + O$ (from the metal oxide catalyst lattice)
(2) $CH_4 + 3O$ (from the catalyst)$= CO + 2H_2O$
(3) $CO + \frac{1}{2}O$ (from the catalyst)$= CO_2$
(4) $Me_2O_3 + \frac{1}{2}O_2$ (from air)$= 2MeO_2$
(5) $CH_4 + 2O_2 = CO_2 + 2H_2O$ (uncatalyzed reaction)
(6) Desorption of $CO$, $CO_2$, $H_2O$ from the catalytic surface The basic concept of a combustion reaction is that the new molecules of hydrocarbon ($CH_4$) and the oxygen from air has to take some energy in order to be able to react and produce more energy. That energy is called activation energy.

Most of the activation energy of reactions (1), (2), and (3) is provided by the very active atomic oxygen coming from the active catalyst lattice, and thus require less energy be taken from the energy generated by combustion. In other words the combustion using an activated catalyst will take less energy from the system compared to the uncatalyzed reaction (5) above.

In reaction (5) hydrocarbons ($CH_4$) will also react with oxygen from air to produce finally $CO_2$ and $H_2O$. The activation energy for this reaction requires more energy to be taken from the system or the heat (energy) generated by the combustion. In other words, without the catalyst, the reaction consumes some its own energy which produces less heat energy when compared with a reaction that utilizes an activated catalyst.

A lot of the stable (not activated or atomic) oxygen on the catalyst surface may weaken the bond between hydrogen and carbon in $CH_4$ molecules absorbed or adsorbed on the surface of the catalyst. Oxygen is known to have a high affinity for hydrogen. The oxygen coming from the lattice to the surface of the catalyst traveling from vacancy to vacancy with very high speed or enough energy to react with an already weakened $CH_4$. The oxygen traveling from vacancy to vacancy gets the energy/speed from the oxide lattice not from the combustion in process.

It is important to observe that most of the oxygen for high efficiency combustion is provided by the catalyst oxide. The reaction (3) above requires a much lower activation energy and in turn will take much less energy from the system. This reaction (3) is an order of magnitude faster than the oxidation reaction of nitrogen. Therefore, the catalyst will recover the oxygen lost from the air supplied for combustion. The key goals when making a more active catalyst metal oxide include:

(1) To increase the available oxygen defects or vacancies in the lattice.
(2) To increase the surface area available for combustion reaction by using submicron metal oxides, and
(3) To have a controlled particle size for the metal oxide catalyst tailored for specific combustion application.

Making an Activated Metal Oxide Catalyst

Figure 2:
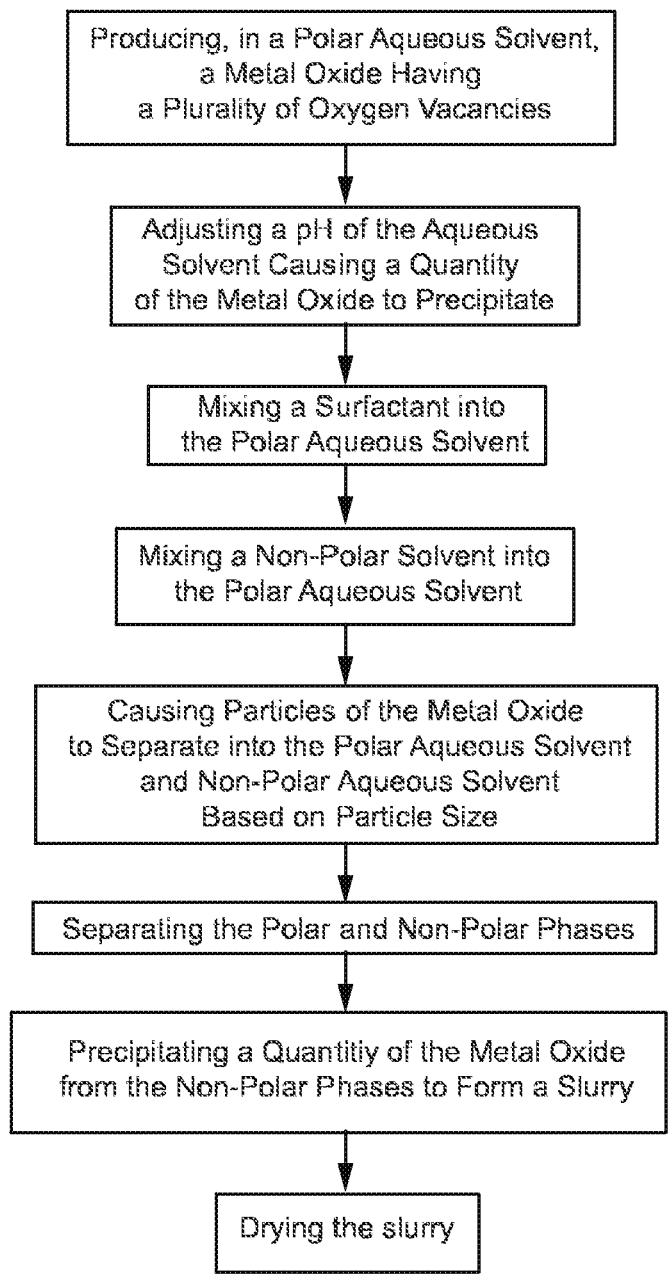
FIG. 2 illustrates an embodiment of a process for producing a ceramic catalyst.

FIG. 2 illustrates an embodiment of a process for producing a ceramic catalyst. When producing a ceramic catalyst, two important steps have to be observed:

(1) Make as much concentrated solution of the element to be precipitated so they will generate a large micro center of crystallization.
(2) Cover as much of the surface of the particles as possible with a proper surfactant.

The freshly made hydroxide or carbonate particles in the precipitation reaction will have a very active surface energy. Attractive van der Waals forces will make the particle stick together, so it is important to add a proper surfactant to the particle surface to physically keep the particles at a distance such that they cannot agglomerate uncontrollably. The surfactant tail has to be long enough to cope with the attractive van der Waals forces. The carbon chain of the surfactant tail should be a minimum of 15 carbon atoms for more nanometer particles in the size distribution and for larger particles in the distribution the surfactant tail could be as high as 40 carbon atoms in the chain tail.

Description of Making Submicron Metal Oxide Particles

Example 1

Making Activated Magnetite ($Fe_3O_4$)

To precipitate a mole of magnetite ($Fe_3O_4$), or 231 grams, particles are prepared using a mole of Ferrous Sulfate Heptahydrate ($FeSO_4 \cdot 7H_2O$), or 278 grams, and 243 grams of Ferric Chloride Hexahydtrate, which is 10% less than a mole of $FeCl_3 \cdot 6H_2O$ (270 grams) all dissolved in 900 ml water. The salt components should be dissolved in water at room temperature. A mole of magnetite is a crystal mixture one mole of Ferric Oxide ($Fe_2O_3$) and one male of Ferrous Oxide. Using 5 to 20% less than a mole of Ferric ($Fe^{3+}$) salt in the formulation will result in less oxygen than in formula for $Fe_3O_4$. The activated magnetite will have a formula of $Fe_3O_{4-x}$, in which X is approximately 0.05 to 0.2. The $Fe_3O_{4-x}$ has many oxygen defects in the crystal lattice. An embodiment of a process for the formation of $Fe_3O_4$ is further described herein:

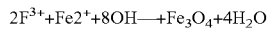

$$2F^{3+} + Fe^{2+} + 8OH^- \rightarrow Fe_3O_4 + 4H_2O$$

Introduce a 35% ammonia solution to the polar aqueous solvent in which the activated metal oxide was produced until the mixture gets to a pH of 12. Then add 100 ml of soap under strong agitation. The soap is made of a composition comprising oleic acid and ammonia (35 percent ammonia) solution in a volume ratio of 1:1.

In one embodiment, $Fe_3O_{4-x}$ is precipitated from the above solution is by the slow addition of ammonia solution (35% $NH_3$) to reach the pH of 12. 100 ml of a soap is added under a strong agitation. In one embodiment, the soap composition is oleic acid solution in volume ratio of 1:1.

The magnetite particles, $Fe_3O_{4-x}$, covered with oleic acid are mixed for 30 minutes at 60-90° C., then 500 cc of heptane, hexane or a different hydrocarbon is added to the suspension under constant agitation for 40 minutes.

After a period of strong agitation, all the magnetite particles, well covered with oleic acid, which has a hydrophobic tail, are dispersed in the hydrocarbon solvent fraction. The nanoparticles of $Fe_3O_{4-x}$ well covered with surfactant are concentrated in the hydrocarbon solvent. The $Fe_3O_{4-x}$, crystals in the hydrocarbon solvent has a particles size distribution of 70-1000 Angstroms (7-1,000 nanometer) with more than 4 order of magnitude surface area in comparison with particles in the range of millimeter size diameter. There is also a tail of 5 to 20% particle size distribution up to millimeter particles size. The hydrocarbon solvent may then be transferred into a separate container. The solution should then be mixed with a chemical such as acetone in order to flocculate the $Fe_3O_4$. The magnetite may be allowed to settle with the aid of a magnet or centrifugation and the supernatant liquid may be siphoned off. The operation may be repeated in order to eliminate the excess of oleic acid.

Particles Screening

There are 3 steps to screen the range of metal oxide catalyst nanometers particles and the submicron metal oxide catalyst particles:

1. Once the metal oxide particles are well covered with surfactant they will be dispersed in the hydrocarbon solvent. Most of the metal oxide catalyst particles or agglomerates of particles of micron size will remain in the water solution and the metal oxide catalyst nanometers size up to submicron size will be dispersed in the hydrocarbon solvent (non-polar) or supernatant fraction.

2. Adding small amount of acetone (polar solvent) as 5-25% volume to 1000 cc of supernatant hydrocarbon solvent will allow the larger aggregate or micron to submicron particles to flocculate and could be separated by centrifuge. The remaining metal oxide catalyst particles distribution suspended in supernatant hydrocarbon mixture with acetone liquid will be more concentrated in nanometers particles.

3. The precipitate from procedure 2 above can be washed a few times with water to remove the salts resulted during the formation of crystal metal oxide catalyst particles with ammonia solution. By mixing this washed precipitate with a solution of 15-65% acetone mixed with hydrocarbon solvent, we can extract from precipitate the small particles which co-flocculated with the larger particles. The extracted smaller particles will be mixed with the rest of the supernatant hydrocarbon solvent resulted from procedure 1 above.

Repeating the operation 1, 2, and 3 will result in a narrow particles distribution of nanoparticles or of large particles as needed.

In the present invention, the length of the tail of the surfactant and concentration of the solution where the precipitation take place will have an influence on the particles size distribution. The lager the surfactants, the larger particle will be transferred from the water ammonia solution to the heptane (hydrocarbon). It should be observed that some of the surfactant tail over 30 atoms in the chain without to many double bonds between the carbon, will tend to bend or fall on the particles and it will act as a smaller tail surfactant.

The $Fe_3O_{4-x}$, covered with surfactant separated by a final flocculation and centrifugation will be a slurry. The slurry should be dried at approximately 80° C. in order to remove the acetone.

The $Fe_3O_{4-x}$, produced in this manner has many oxygen defects or vacancies, particle size distribution between 70-500 Angstroms (7-50 nanometer) with more than 4 order of magnitude surface area in comparison with particles in the range of millimeter size diameter.

In one embodiment, one mole of 7-1,000 nanometer to submicron particles size distribution of $Fe_3O_{4-x}$ is formed in a salt water solution by co-precipitation of one mole of $Fe^{2+}$ with 0.1 to 30% less than one mole of $Fe^{3+}$ in the presence of ammonia surfactants solution and extracted in a hydrocarbon solvent.

CuO, ZnO were precipitated as hydroxide as in step 3 and 4 above or as carbonate. To obtain Cu or Zn carbonate a $(NH_4)_2CO_3$ or $K_2CO_3$, 35% solution was used. The precipitate is washed with acetone to remove the execs oleic acid, the carbonate or hydroxide precipitate may then be calcinated in order to obtain the metal oxide. The particle size distribution before calcination was 200 nanometers to submicron particle size.

In one embodiment, one mole of 7-1,000 nanometer to submicron particle size distribution of ZnO is formed in a salt water solution by precipitation in the presence of ammonia surfactants solution and extracted in a hydrocarbon solvent. The zinc oxide (ZnO) nanometers particles have a larger amount of oxygen vacancies or Zn interstitial defects than bulk ZnO.

In another embodiment, one mole of nanometer 70-10,000 Angstroms or 7-1,000 nanometers to submicron particle size of CuO is formed in a salt water solution by precipitation in the presence of ammonia surfactants solution and extracted in a hydrocarbon solvent. The copper oxide (CuO) nanometers particles have a significant amount of oxygen vacancy.

Example 2

Making Active Cerium Oxide

We made the observation according with this invention that by co-precipitating $Ce^{4+}$ and $Ce^{3+}$ as carbonates which then are decompose high temperature in Cerium oxides and CO2. The catalytic effect of co-precipitated $CeO_2/Ce_2O_3$ helps the efficiency of combustion reaction. $Ce^{4+}/Ce^{3+}$ has the ability to shift between $CeO_2$ and $Ce_2O_3$ and back to $CeO_2$ under reduction and subsequent oxidation reaction condition which takes place in the combustion of hydrocarbon and oxygen. This easy transition back and forth creates conditions favorable to formation of labile oxygen vacancy and high mobility of oxygen in the catalytic crystal.

$Ce_2O_3$ will be formed for a short period of time from CeO2 in the combustion reaction conditions, however the co-precipitation of these two oxides according with this invention increases the catalytic effect of the cerium oxides. This can be explained only by the fact there is more oxygen vacancy in the co-precipitated oxides. We identified by X-Ray analysis a small presence of the oxide cluster $Ce_3O_5$ which can be a combination of $CeO_2$ and $Ce_2O_3$ as it is happening on co-precipitation of magnetite.

The ratio $Ce^{4+}/Ce^{3+}$ in the starting formula is 3/1 by weight. The next steps are precipitation, extraction of cerium oxide or their precursor in the hydrocarbon solvent, and the rest of the procedure of screening the particles as in Example 1 above.

In one embodiment, one mole of 7-1,000 nanometer to submicron particle size distribution of cerium oxide or ceria $CeO_{4-X}$ ($Ce^{4+}$) is formed in salt water solution by co-precipitation of $Ce^{4+}/Ce^{3+}$ mole ratio of 0.1 to 10 in the presence of ammonia surfactants solution and extracted in a hydrocarbon solvent.

Example 3

Making Active Chromium Oxide

For this example we used 400 g of $Cr(NO_3)_3(H_2O)_9$ dissolved in 1000 cc of water at room temperature. The starting pH of the solution was 2 than 5 g of Zinc or Iron powder to reduce a small amount of $Cr^{3+}$ to $Cr^{2+}$. Small amount of $NH_4OH$ 20% was added to bring the value of pH to 7 for a few minutes than with $NH_4OH$ was added to precipitate particles of $Cr(OH)_3$ at about pH 11. Immediately a 100 cc of oleic or stearic acid soap solution with 35-45% ammonia was added to cover the $Cr(OH)_3$ particles with oleic or stearic acid surfactant, agitated for 5 minute and 500 cc of Hexane was added to extract the $Cr(OH)_3$ particles hexane solvent. On the supernatant containing chromium hydroxide covered with surfactant was added small amount of acetone to produce $Cr(OH)_3$ particles size distribution of 50-300 nanometer after a few repeating steps as presented in Particle Screening of Example 1.

The precipitate was dehydrated at about 100° C. for about 120 minutes and produce $Cr(OH)_3$ dehydrated and some $Cr_2O_3$ or calcinated to 900-1000° C. for 60 minute to produce 98% $Cr_2O_3$ nanoparticles in the size range from 100-1000 nanometer with many oxygen vacancy or defects. We identify that some trace of $Ce^{2+}$ oxide co-precipitated with $Cr^3$ oxide to make possible some of the oxygen defects.

In embodiment, one mole of 7-1,000 nanometer to submicron particle size distribution of chromium oxide $Cr_2O_{3-X}$ is formed in a salt water solution by co-precipitation of $Cr^{2+}/Cr^{3+}$ mole ratio of 0.001 to 0.1 in the presence of ammonia surfactants solution and extracted in a hydrocarbon solvent.

Example 4

Making of Ceramic Catalyst Support

Precursor or Catalyst Support Description.

The ceramic precursor which will become the catalyst support in this invention comprises the following minerals: Magnesium oxide MgO, Silicium dioxide $SiO_2$, and Aluminum oxide $Al_2O_3$.

This oxide can be obtained from a variety of vendors either already in a stoichiometric composition to make cordierite or not mixed yet. The precursor is the stoichiometric composition of pre mixed to make cordierite, the catalyst support. In this example the catalyst support is Cordierite. However, it should be understood that any type of ceramic which has very high thermal shock resistance is a proper carrier such as Molochite, Petalite, Cordierite ceramic, or silicon carbide employed in an example below. These ceramic materials have very low coefficient of thermal expansion therefore their resistance to thermal shock is very high despite of low ductility (e.g. fused silica). These ceramic materials retain their properties at elevated temperatures due to the strong ionic-covalent bonding. Ceramics working at high temperature are called refractory ceramic materials.

The starting stoichiometric composition to make cordierite is $2MgO.2Al_2O_3.5SiO_2$. This stoichiometric mixture is then mixed in a rotating container with water to obtain a semi dried ceramic cake which is pressed in a press to a size of, for example, 150 mm×100 mm×50 mm in a standard ceramic press. The cakes are then dried in an oven at approximately 105° C. for approximately 24 hours.

The next step is to heat the cakes in an electric or gas fired furnace at approximately 1350° C. for approximately 6 hours to form the cordierite catalytic support. The hot cordierite cake will be cooled slowly down to room temperature in 12-15 hours. The cordierite at this stage will be analyzed by X-Ray to see that all the oxide used in the process initially has fully reacted to form cordierite. The cordierite will be reduced in size to a powder to the size of 90% through 0.5 mm sieve in a ball mill. A similar support may be made from silicon carbide or molochite ceramic.

Mixing the Catalyst Support with Metal Oxide Catalyst Composition.

The next step will be to provide a mixture of powder cordierite or silicon carbide or molochite ceramic with a clay composition and with a slurry mixture of carboxymethyl cellulose (CMC) and metal oxide catalyst composition.

The first mixture consisting of cordierite or silicon carbide or molochite ceramic powder is mixed with clay porcelain ball mill for 30 minutes, the weight ratio of cordierite to clay is 80% to 20%. On top of the first mixture is added a slurry made of CMC, water and the activated metal oxide. In one embodiment, the total weight of the metal oxide particles of an activated metal oxide may be 1-30% relative to the total weight of the ceramic catalyst. The slurry is made in a separate container under agitation; the amount of water added is to provide a consistency of slurry to a paste. This paste is mixed with cordierite and argyle present in the ball mill for 30-60 more minutes to make a ceramic mass.

The ceramic mass is added to a pressure mold, which will provide for the necessary holes, the size and shape for the ceramic catalyst. The pressure required is a minimum of 40 ton/square cm.

Next step is be to dry the ceramic catalyst at 110° C. in an oven followed by a thermal treatment in a gas fired or electrical furnace. The rate of heat increase is 10° C./minute to 1300° C. followed 6 hours at this temperature and then by 12-hours of cooling down to room temperature. The final product is then ready for a final cleaning and quality control.

Example 5

An advanced ceramic catalyst where the catalyst support is a porous material with porosity ranging from 5 microns to 5 millimeters diameter holes. In one embodiment, the porosity ranges preferably from 5 to 500 microns diameter holes. In another embodiment, the porosity ranges preferably from 500 microns to 5 millimeters diameter holes. The catalyst support is kept vertically for 4-10 hours in a hydrocarbon solution of metal oxide catalyst having a particle size distribution from 0.01 micron to 1 micron. The solution may be prepared as described above. Next, the porous catalyst support with the pores having been at least partially filled with the said hydrocarbon base suspension are removed from the bath containing hydrocarbon base suspension and is kept at room temperature for approximately half an hours in the ventilating hood than immediately introduce in a vented drying oven at 100° C. for about 4 hours followed by an hour processing in a furnace at 1000° C.

In a further embodiment, an advanced ceramic catalyst from this dried catalyst support or precursors is processed by mixing it with a desired concentration of 2-20% dried formulation catalyst and grinding the mixture in a ball mill until all the material passes through 325 mesh screen. Upon passing through the mesh, the ground formulation catalyst and catalyst support is mixed with carboxylmethyl cellulose (CMC) in a weight ratio of 20 parts to 02.-1 parts CMC, and 5 to 10% water. Then, the mixture passes through a molding press in order to obtain the desired shape, number, and diameter of the holes of the ceramic catalyst, wherein said desired ceramic catalyst shape is dried at 110° C. for 10-24 hours.

We also made the observation that in the process of making the ceramic catalyst, a quantity of the nanometer sized particles of the formulation catalyst oxide may also act as a glue to help in binding together the large particles of the ceramic material support (such as molochite or cordierite and the like), giving an extra strength to the whole composite during the calcination process of up to 1400° C. and beyond. In one embodiment, a quantity of the nanometer sized particles of the formulation catalyst may melt during the calcination process, the melted nanometer sized particles being used to bind together the particles of the ceramic material support.

Example 6

Testing the Advanced Ceramic Catalyst

The ceramic catalyst, the ceramic components and the oxides have been analyzed by different chemical analysis and physical testing including Atomic Absorption, Electron Microscopy, X-ray Spectroscopy, X-Ray Photoelectron Spectroscopy and others. These helped to understand the process and set up quality control specification for industrial production.

One test related to the use of the advanced ceramic catalyst in real life applications. A commercial top range with two identical burners was used. One of the burners was used as reference and the other one has been adapted to accommodate the ceramic catalyst on the top. A pressure gage, flow meters and thermocouple with digital meter were installed for both burners. Natural Gas ($CH_4$) was used from a large container to make sure the concentration of the hydrocarbon was the same on all the experiments. A flow of 380-560 liters of $CH_4$/hour was supplied at 15 MPa to both burners. We used a 8,000 cc Clad-Stainless Stockpot and the amount of water in each was 6,000 cc. We measured the time for the water to get from 25° C. to 100° C., the boiling point. At the boiling point we lowered the Natural Gas ($CH_4$) flow to 1 liter/minute to observe if this flow can maintain the boiling process. The outside pressure was also observed. The tests result presented in Table 1 below are the mean value of 3 similar runs. Using this experimental setup, we managed to screen the combustion performance for many combinations of the metal oxide that will give the shorter time to boiling.

One preferred embodiment of the metal oxide formulation catalyst in the advanced ceramic catalyst according to this invention is a mixture of up to 30% particles of 7-1,000 nanometers size distribution and 70% particles of the same metal oxides of submicron to millimeters size distribution. Increasing the amount of nanometer particles to over 30% in the formulation catalyst produced at random a few times combustion which melted the stainless steel support of the ceramic catalyst. These phenomena suggest that there are opportunities to further increase the combustion efficiency.

TABLE 1

| | | | Time to Temperature | | | | |
|---|---|---|---|---|---|---|---|
| | NG | NG | Time To Temperature (s) | | | | NG used |
| Burner | L/h | Pressure | 21° C. | 40° C. | 80° C. | 100° C. | L/run |
| BOM1 | 424 | 35 | 0 | 315 | 925 | 1425 | 169.6 |
| BOM2 | 380 | 35 | 0 | 330 | 1080 | 1710 | 180.5 |
| ACC28 | 380 | 35 | 0 | 285 | 825 | 1220 | 129 |
| BOM1 | 547 | 35 | 0 | 210 | 810 | 1320 | 200.6 |
| ACC28 | 533 | 35 | 0 | 210 | 575 | 840 | 124.4 |
| ACC36 | 560 | 35 | 0 | 150 | 550 | 750 | 116.7 |
| ACC37 | 533 | 35 | 0 | 190 | 565 | 790 | 116.9 |

BOM—one of the best burners on the market
ACC—our Advanced Ceramic Catalyst of different formulations
NG Natural Gas ($CH_4$); L/H Liter of NG per Hours
NG Pressure in mm $H_2O$
Time in seconds to reach 21, 40, 80, 100° C.
NG used in Liters of NG used to boiling temperature of 100° C.

An exemplary formulation of a ceramic catalyst comprises $CeO_{2-x}/Ce_2O_3$ preferably from about 0.5 to 5% weight relative to the total weight of the ceramic catalyst, $Fe_3O_{4-x}$, preferably from about 0.5 to 7% weight, CuO preferably from about 0.5 to 2% weight, $Cr_2O_{3-x}$ preferably from about 0.3 to 7% weight, ZnO preferably from about 0.5 to 2% weight, $MnO_{2-x}$ preferably from 0.5 to 7% weight, and the ceramic support Cordierite or Molochite makes the difference up to 100% weight. The formulation catalyst had 30% particles of 7-1,000 nanometers size distribution and 70% particles of the same metal oxides of submicron to millimeters size distribution.

Example 7

Another preferred embodiment of the ceramic catalyst (see burner ACC36 in Table 1) in percentage weight relative to the total weight of the ceramic catalyst comprises Molochite ceramic 69% or silicon carbide 69% or Cordierite 69%, clay 15%, $CeO_{2-x}$ 5%, $Fe_3O_{4-x}$ 4%, $MnO_{2-x}$ 1%, $Cr_2O_{3-x}$ 4%, CuO 1% and $ZnO_{-x}$ 1%. In one embodiment, the sum of catalyst metal oxides are not to exceed 10.5% in the final formulation of the ceramic catalyst. The formulation catalyst had 30% particles of d 7-1,000 nanometers size distribution and 70% particles of the same metal oxides of submicron particles to millimeters size distribution. With this particular formulation the advanced ceramic burner used 43% less natural gas to bring 6,000 cc of water to the boiling point. The ceramic catalyst of this formulation also took 12 minutes and 30 seconds (750 seconds) to bring water to a boil. The Natural Gas flow rate was reduced from 5 liter/minute to 1 liter/minute and the ceramic catalyst still maintained the boiling process.

The reference burner without ceramic catalyst has a time to boiling point of 18 minutes and the Natural Gas flow rate to maintain the boiling could only be reduced to 3.5 liter/minute.

Therefore, the reference burner used almost 2 times more Natural Gas to bring the water to boiling point in comparison with the same burner equipped with our ceramic catalyst as described in this example. The reference burner used 3.5 time more natural gas than our advanced ceramic catalyst in order to maintain the water boiling. The above composition also reduces 85% of carbon monoxide emission in comparison to the burner without ceramic catalyst.

The Measurements are Made as Follows:

A small hood was placed on top of the burners and the emission from the hood was the point of measurement using a calibrated Carbon Monoxide Z-500XP (made by Environmental Sensor Co).

The mean value of about 5 days with 3 measurements a day has produced 31 ppm of carbon monoxide of the reference burner and 15 ppm as the maximum measurement and 8 ppm the minimum measurement value for the ceramic catalyst as in example 4.

Average levels of CO in homes without gas stoves vary from 0.5 to 5 parts per million (ppm). Levels near properly adjusted gas stoves are often 5 to 15 ppm and those near poorly adjusted stoves may be 30 ppm or higher.

The Consumer Product Safety Commission recommends levels not to exceed 15 ppm for 1 hour or 25 ppm for 8 hours in indoor environment.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A ceramic catalyst composition comprising:
   activated metal oxide comprising metal oxide particles of controlled diameters in a range from one nanometer to eight millimeters arranged in a crystal lattice, wherein the activated metal oxide has less than stoichiometric oxygen in the crystal lattice, the metal oxide particles having a plurality of oxygen vacancies in the crystal lattice, the crystal lattice configured to allow oxygen to migrate to a surface of the metal oxide by diffusing from one oxygen vacancy to another allowing the metal oxide to reduce and oxidize molecules on its surface, the diffusion rate of oxygen being directly related to the number of oxygen vacancies, the number of oxygen vacancies increasing as the diameter of the metal oxide particles decreases; and
   a catalyst support, the catalyst support being ceramic and made of a material having a very low coefficient of thermal expansion of 0.5 to 5 micrometer/m ° C. and a very low thermal conductivity of 0.01 to 5 W/m ° K at 800° C., the metal oxide being uniformly dispersed throughout the catalyst support.

2. The catalyst composition of claim 1 wherein the activated metal oxide is selected from the group consisting of CeO2-x/Ce2O3, CeO4, Fe3O4-x, MnO2-x, Cr2O3-x, CuO, ZnO-x, and combinations thereof.

3. The catalyst composition of claim 2 wherein the catalyst support is selected from the group consisting of molochite, silicon carbide, petalite, cordierite, and combinations thereof.

4. The catalyst composition of claim 3, further comprising:
   cordierite at approximately sixty nine percent weight of the catalyst composition;
   $CeO_{2-x}$ at approximately 0.1 to 10 percent weight of the catalyst composition;
   $MnO_{2-x}$ at approximately 0.1 to 10 percent of weight of the catalyst composition;
   $Cr_2O_{3-x}$ at approximately 0.1 to 10 percent weight of the catalyst composition;
   CuO at approximately 0.1 to 5 percent weight of the catalyst composition; and
   $ZnO_{-x}$ at approximately 0.1 to 5 percent weight of the catalyst composition.

5. The catalyst composition of claim 1 wherein the activated metal oxide is a bivalent or multivalent metal.

6. The catalyst composition of claim 5 wherein a metal oxide of the activated metal oxide is selected from the group consisting of Fe, Cr, Ce, Zn, Mn, Cu, Mo, Sn, Sb, V, Zr, Co, Ni, W, and combinations thereof.

7. The catalyst composition of claim 1 wherein the diameter of the metal oxide particles ranges from 7 nanometers to 1000 nanometers.

* * * * *